United States Patent [19]

Ferreira

[11] 4,446,637

[45] May 8, 1984

[54] CHAFING GEAR FOR FISHING DRAG

[76] Inventor: Thomas Ferreira, 9 Westhill Rd., Mattapoisett, Mass. 02739

[21] Appl. No.: 457,014

[22] Filed: Jan. 10, 1983

Related U.S. Application Data

[63] Continuation of Ser. No. 211,261, Nov. 28, 1980, abandoned.

[51] Int. Cl.³ .......................... E02F 5/00; A01K 73/02
[52] U.S. Cl. ............................................. 37/55; 43/9
[58] Field of Search ........................ 37/119, 55; 43/9

[56] References Cited

U.S. PATENT DOCUMENTS

| | | | |
|---|---|---|---|
| 122,423 | 1/1872 | Williams | 37/119 |
| 373,646 | 11/1887 | Cook | 37/119 |
| 1,104,154 | 7/1914 | Stinson | 37/119 |
| 1,548,409 | 8/1925 | De Boer et al. | 43/9 |
| 3,136,085 | 6/1964 | Luketa | 43/9 |
| 3,458,947 | 8/1969 | Ross | 43/9 |
| 4,328,629 | 5/1982 | Bruce, Jr. et al. | 43/9 X |
| 4,349,972 | 9/1982 | Bruce, Jr. et al. | 37/55 |

FOREIGN PATENT DOCUMENTS 16998 of 1907 United Kingdom .................... 37/55

*Primary Examiner*—Clifford D. Crowder

[57] ABSTRACT

This invention is directed at chafing gear for a fishing drag. The drag has a bottom portion comprising metal rings loosely connected by metal links. The chafing gear comprises rubber disks, each of which have a central aperture through which a metal link is passed thereby positioning the disk between two adjacent rings.

6 Claims, 4 Drawing Figures

CHAFING GEAR FOR FISHING DRAG

This is a continuation of application Ser. No. 06/211,261 filed Nov. 28, 1980, now abandoned.

BACKGROUND OF THE INVENTION

The method of scallop fishing called dragging utilizes a chain bag or drag formed, on the bottom and sides, at least by a series of metal circular or elliptical elements or rings loosely attached to each other by links providing a net-like configuration. During use, the rings or links may be damaged or lost requiring repair or replacement. Originally, and in some locations, even today, the rings were replaced by engaging the open link to the replacement ring and to an adjacent ring and then pounding the link, using one rock as an anvil and another as a hammer, into the closed position.

In order to avoid the inefficiencies of the use of rocks, a tool was devised which utilizes a pair of long handles, each of which moved a pair of jaws toward each other. Although the use of the tool is more efficient and effective than using rocks, many hours are still required to repair a badly damaged drag. Not only is time lost in repairing the drag, but obviously a damaged drag is not fishing and since the fishing boats can only be out fishing for a fixed amount of time, each fishing hour is precious and lost fishing hours are reflected in lost profits.

In order to reduce the number of times that it is necessary to repair the drag, the inventor passes each of a series of selected links through a central aperture in a rubber disk. The array of disks protects the links and rings considerably reducing the damage which would normally occur to unprotected drags and thereby considerably reducing the down time of a working drag.

SUMMARY OF THE INVENTION

The chafing gear of the invention is used with a purse-like drag. The bottom of the drag includes metal rings connected by metal links and each of several selected links are passed through a central aperture formed in individual rubber disks. The disk is thus positioned between two rings and may be engaged in a manner which will allow it to rotate in substantially the same direction as that towards which the drag is being moved over the ocean floor. The disks may be positioned and dimensioned in such a manner as to space the major portion of the bottom surface of the drag from the ocean floor.

BRIEF DESCRIPTION OF THE DRAWINGS

Further details are explained below with the help of the examples illustrated in the attached drawings in which.

DESCRIPTION OF THE PREFERRED EMBODIMENTS

Figure 1:
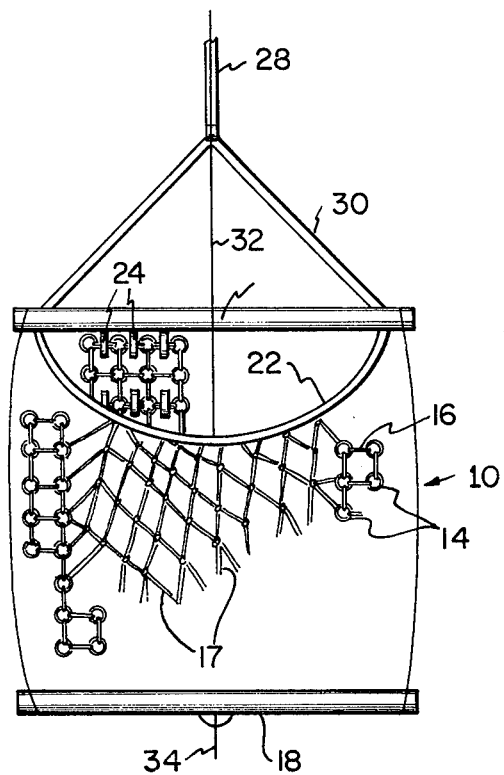
FIG. 1 is a plan view of drag assembly rigged to be moved over the ocean floor showing a portion of the bottom of the drag engaged to the chafing gear according to the present invention.
Figure 2:
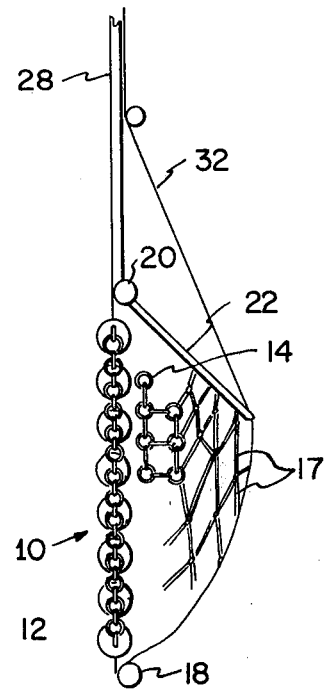
FIG. 2 is a side elevational view of the drag assembly shown in FIG. 1.

As disclosed in the drawing and particularly in FIGS. 1 and 2 there is shown a chain bag, dredge bag or drag 10, which is used in fishing such as scallop fishing, for example. The drag 10 comprises a bottom portion 12 and side portions which are formed of metal rings 14 loosely connected together, with most rings connected to adjacent rings 14 by a single or a pair of links 16 which are also formed of a metalic substance, such as steel or iron. The upper portion of the drag 10 is made of twine 17, which is tied in a diamond pattern. The drag 10 in external configuration resembles an old-fashioned purse closed at one end by a dumping bar 18 and open at the opposite end as shown in FIG. 1. The rim of the open end of the drag 10 is provided by a straight bar 20 to which the bottom portion 12 is attached and an arced flip bar 22 whose terminal ends are engaged to the bar 20 and which is engaged to the sides and upper portions of the drag 10. Selected links 16 of the bottom portion 12 are circumscribed by disks 24 which are formed of a rubber or plastic material, for example. The disks 24 are oriented so that the planes of their sides 26 are in parallel relation with a line drawn from the center of the bar 20 to the center of the dumping bar 18. Each of the disks 24 has a central aperture formed therethrough whose axis is at right angles to the sides 26 and through which the link or links 16 are passed. The design contemplates that sufficient disks 24 be engaged with the bottom portion 12 of the drag 10 to maintain the links 16 and rings 14 in random spaced relation to a large part of the ocean floor over which they are passed.

Figure 3:
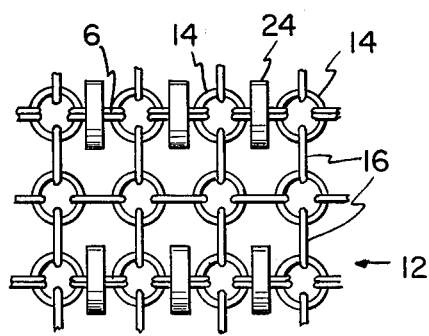
FIG. 3 is a plan view, enlarged, of a portion of the bottom of the drag shown in FIG. 1.
Figure 4:
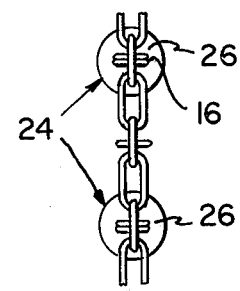
FIG. 4 is a side elevational view of a portion of the bottom of the drag shown in FIG. 1.

The pattern of the rings 14 and disks 24 disclosed in FIG. 3 would achieve the mentioned spaced relation between the ocean floor and the bottom portion 12, however, other patterns would also operate successfully. The efficiency of the drag operation would be increased if the relationship of the links 16 and disks 24 were such that the disks 24 rotated around the links 16 which act as an axis thereby rolling the drag 10 over the ocean floor.

The drag 10 is pulled over the ocean floor by a main cable 28, which is attached to the drag 10 at the apex of a metal triangle 30 which is connected to the bar 20. The cable 28 is adapted to be moved over a drum of a winch on the deck of a scallop boat, for example (not shown). As the drag 10 is moved over the ocean floor, tension is applied to a line 32, which is attached to the center of the flip bar 22, lifting the flip bar 22 away from the bottom portion 12 thereby opening the mouth (i.e. open end) of the drag 10. When it is time to dump the contents of the drag 10, it is winched up out of the ocean through the use of the main cable 28 and is then swung aboard the scallop boat. The drag 10 is then dumped, by releasing tension of the main cable 28, on the deck of the boat and a second line 34 attached to the center of the dumping bar 18 is pulled upward, upending the drag 10, emptying it of its contents. The disks 24 act as bumpers protecting the links 16 and the rings 14 from damage when the drag 10 is dropped on the deck and is swung up again prior to being dropped over the side for its next run.

What I claim is:

1. The combination of a fisherman's drag and chafing gear, the drag having an open end, a closed end, at least a first ring and a second ring and a midline extending from the open end to the closed end, the first and second rings connected together by a first link, the chafing gear comprising a first disk, the first disk including a surface and having an aperture centrally formed therethrough at right angles to the surface of the disk, the aperture having a wall defining the same, the wall circumscribing a portion of the first link and the surface of the disk being in parallel relation to the midline.

2. A combination of a drag and chafing gear as set forth in claim 1 wherein the drag includes a third ring, the third ring connected to the second ring by a second link, the chafing gear including a second disk, the second disk in parallel relation to the midline of the drag and the second disk having an opening centrally formed therethrough, the second link passed through the opening.

3. The combination of a drag and chafing gear as set forth in claim 2 wherein the second disk has a surface and the first, second and third rings lie on a horizontal plane in angular relation to the surface of the first disk and the surface of the second disk.

4. The combination of a drag and chafing gear as set forth in claim 3 wherein the first and second disks are made from an elastomeric material.

5. The combination of a drag and chafing gear as set forth in claim 1 wherein the first and second disks are made from synthetic rubber material.

6. The combination of a drag and chafing gear as setforth in claim 3 wherein the surface of the first disk and the surface of the second disk are in spaced parallel relation to each other.

* * * * *